United States Patent [19]

Tarumi et al.

[11] Patent Number: 5,242,869
[45] Date of Patent: Sep. 7, 1993

[54] COLORED GLASS

[75] Inventors: Takashi Tarumi, Kawachinagano; Toshihiko Einishi, Ikoma, both of Japan

[73] Assignee: Isuzu Glass Co., Ltd., Osaka, Japan

[21] Appl. No.: 910,562

[22] Filed: Jul. 8, 1992

[30] Foreign Application Priority Data

Jul. 11, 1991 [JP] Japan ................... 3-171239

[51] Int. Cl.$^5$ ............................ C03C 3/11; C03C 4/02
[52] U.S. Cl. ........................................ 501/56; 501/64; 501/66; 501/67; 501/77; 501/78; 501/905
[58] Field of Search ....................... 501/56, 64, 65, 66, 501/67, 77, 78, 79, 905

[56] References Cited

U.S. PATENT DOCUMENTS

| | | | |
|---|---|---|---|
| 2,651,145 | 9/1953 | Stookey | 106/52 |
| 4,222,781 | 9/1980 | Morse et al. | 501/13 |
| 4,374,931 | 2/1983 | Courbin et al. | 501/56 X |
| 4,556,605 | 12/1985 | Mogami et al. | 428/331 |
| 4,746,633 | 5/1988 | Mazeau et al. | 501/56 X |
| 4,757,034 | 7/1988 | Prassas | 501/56 X |
| 5,024,974 | 6/1991 | Nakamura et al. | 501/32 X |
| 5,145,805 | 9/1992 | Tarumi et al. | 501/73 X |

OTHER PUBLICATIONS

C. R. Bamford, "The Application of the Ligand Field Theory to Coloured Glasses", Research Laboratories, Pilkington Brothers Limited, Lathom, Ormskirk, Lancashire, Physics and Chemistry of Glasses, vol. 3, No. 6, Dec. 1962, pp. 189-202.

Woldemar A. Weyl, "Coloured Glasses", Society of Glass Technology, 1951, pp. 89-234.

Primary Examiner—Karl Group
Attorney, Agent, or Firm—Armstrong, Westerman, Hattori, McLeland & Naughton

[57] ABSTRACT

This invention provides (1) a colored glass comprising 20 to 85% by weight of $SiO_2$, 2 to 75% by weight of $B_2O_3$, not more than 15% by weight of $Al_2O_3$, not more than 30% by weight of at least one member of $Li_2O$, $Na_2O$, $K_2O$, $Rb_2O$ and $Cs_2O$, not more than 10% by weight of at least one member of MgO, CaO, ZnO, BaO, SrO and PbO, not more than 10% by weight of at least one member of $ZrO_2$, $La_2O_3$, $Y_2O_3$, $Ta_2O_3$ and $Gd_2O_3$, 0.05 to 15% by weight of at least one copper halide, and 0.001 to 7% by weight of at least one member of oxides of Fe, Ni, Mn, Co, V, Cr, Cu, Nd and Pd; and (2) a colored glass comprising 8 to 25% by weight of $SiO_2$, 5 to 35% by weight of $P_2O_5$, not more than 30% by weight of $B_2O_3$, 10 to 35% by weight of $Al_2O_3$, 5 to 20% by weight of at least one member of $Li_2O$, $Na_2O$, $K_2O$, $Rb_2O$ and $Cs_2O$, not more than 20% by weight of at least one member of MgO, CaO, ZnO, BaO, SrO and PbO, not more than 10% by weight of at least one member of $ZrO_2$, $La_2O_3$, $Y_2O_3$, $Ta_2O_3$ and $Gd_2O_3$, 0.05 to 15% by weight of at least one copper halide, and 0.001 to 7% by weight of at least one member of oxides of Fe, Ni, Mn, Co, V, Cr, Cu, Nd and Pd.

2 Claims, 11 Drawing Sheets

COLORED GLASS

BACKGROUND ART

The present invention relates to colored glass.

It should be understood that throughout this specification the symbol % means percentage by weight.

Colored glass containing colored ions exhibits its expected functions by absorbing light, either broadly or sharply, in the ultraviolet, visible or near-infrared region of the spectrum. Examples of colored glass contain at least one of such ions as Fe, Ni, Co, V, Ce, etc. as incorporated in the base glass. These types of colored glass have been used in distinct applications according to their transmission and absorption characteristics, for example as optical filters such as neutral density filters, blue filters, etc., sunglasses, colored glasses for containers, colored plate glass and so on.

However, the conventional colored glass has not fully satisfied the performance requirements in such respective applications. For example, when colored glass is used for sunglasses, it is not only required to have the expected transmission characteristic with regard to visible light but desirably should intercept light in the ultraviolet region, which is harmful to the eye, with substantial thoroughness. Actually, however, when the absorption of visible light is set to the transmittance value suited to sunglasses, the conventional colored glass passes most of the harmful light in the ultraviolet spectrum, too. On the other hand, if an UV absorbing colored ion, such as Ce, is incorporated in glass to the extent completely absorbing light in the ultraviolet region, light in the visible region is also mostly absorbed because of its broad absorption characteristic, with the result that the colored glass cannot discharge the function required of sunglasses. Therefore, whenever the conventional colored glass is used for sunglasses, either the transmittance characteristics of visible light or that of ultraviolet light has to be sacrificed.

SUMMARY OF THE INVENTION

The primary object of the present invention is to provide a colored glass which exhibits the desired transmittance characteristic which can be achieved by incorporated colorants in the visible region of the spectrum and can substantially completely intercept light of wavelengths not longer than a selected wavelength within or near the ultraviolet region.

In view of the above shortcomings of the conventional colored glass, the inventors of the present invention made intensive investigations for developing new types of colored glass that could accomplish the above-mentioned object. As a consequence, the inventors discovered that when a copper halide, which is a semiconductive substance in the I-VII group, is included in base glass as a dopant together with a certain component, there is obtained a colored glass which intercepts light not exceeding a given wavelength, shows a colorant-associated spectral transmission characteristic almost completely for light longer than said wavelength, and insures an excellent transmission characteristics represented as a sharply inclined curve with a narrow wavelength gradient profile.

Thus, the present invention provides the following kinds of colored glass.

1. A colored glass comprising 20 to 85% by weight of $SiO_2$, 2 to 75% by weight of $B_2O_3$, not more than 15% by weight of $Al_2O_3$, not more than 30% by weight of at least one member of the group consisting of $Li_2O$, $Na_2O$, $K_2O$, $Rb_2O$ and $Cs_2O$, not more than 10% by weight of MgO, CaO, ZnO, BaO, SrO and PbO, not more than 10% by weight of at least one member of the group consisting of $ZrO_2$, $La_2O_3$, $Y_2O_3$, $Ta_2O_3$ and $Gd_2O_3$, 0.05 to 15% by weight of at least one copper halide, and 0.001 to 7% by weight of at least one member of the group consisting of oxides of Fe, Ni, Mn, Co, V, Cr, Cu, Nd and Pd (hereinafter referred to as the first invention), and 2. A colored glass comprising 8 to 25% by weight of $SiO_2$, 5 to 35% by weight of $P_2O_5$, not more than 30% by weight of $B_2O_3$, 10 to 35% by weight of $Al_2O_3$, 5 to 20% by weight of at least one member of the group consisting of $Li_2O$, $Na_2O$, $K_2O$, $Pb_2O$ and $Cs_2O$, not more than 20% by weight of at least one member of the group consisting of MgO, CaO, ZnO, BaO, SrO and PbO, not more than 10% by weight of at least one member of the group consisting of $ZrO_2$, $La_2O_3$, $Y_2O_3$, $Ta_2O_3$ and $Gd_2O_3$, 0.05 to 15% by weight of at least one copper halide, and 0.001 to 7% by weight of at least one member of the group consisting of oxides of Fe, Ni, Mn, Co, V, Cr, Cu, Nd and Pd (hereinafter referred to as the second invention).

The colored glass according to the present invention contains a microcrystalline copper halide as a dopant in a basal glass composition as mentioned above and not only selectively pass light of wavelengths longer than a selected wavelength but substantially intercepts the ultraviolet beam not longer than said wavelength to insure a desired spectral transmission characteristic. Moreover, the colored glass of the invention does not change color even on exposure to intense ultraviolet light so that its intrinsic light transmission characteristic is retained without alteration.

BRIEF DESCRIPTION OF THE DRAWINGS

Referring to the accompanying drawings.

DETAILED DESCRIPTION OF THE INVENTION

Of the glass components of the colored glass of the invention, all components other than copper halide, which is the outstanding feature of the invention, are selected from among the various materials used commonly as glass components.

To be specific, such components other than copper halide in the first invention are selected from among $SiO_2$, $B_2O_3$, $Al_2O_3$, $Li_2O$, $Na_2O$, $K_2O$, $Rb_2O$, $Cs_2O$ MgO, CaO, ZnO, BaO, SrO, PbO, $ZrO_2$, $La_2O_3$, $Y_2O_3$, $Ta_2O_3$, $Gd_2O_3$, and oxides of Ni, Mn, Co, V, Cr, Cu, Nd and Pd, all of which are known components, and used in the specified proportions.

In the second invention, components other than copper halide are also selected from among $SiO_2$, $P_2O_5$, $B_2O_3$, $Al_2O_3$, $Li_2O$, $Na_2O$, $K_2O$, $Rb_2O$, $Cs_2O$, MgO, CaO, ZnO, BaO, SrO, PbO, $ZrO_2$, $La_2O_3$, $Y_2O_3$, $Ta_2O_3$, $Gd_2O_3$, and oxides of Ni, Mn, Co, V, Cr, Cu, Nd and Pd, all of which are known components, and used in the specified proportions.

Of course, in a multi-component glass system, the respective components interact with each other to determine characteristics of the whole system and it may not always valid to discuss the quantitative relation of components in independent terms. However, the ground for the quantitative range shown for each component in the first and the second invention is discussed below.

1. First invention

Of the glass components to be used in the first invention, $SiO_2$ is a main component forming a glass-network and used in a proportion of 20 to 85% by weight, preferably about 50 to 71%, based on the total composition. If the proportion of $SiO_2$ exceeds 85%, the meltability of glass will be adversely affected, while the use of $SiO_2$ in a proportion less than 25% will lead to inadequate chemical permanence or durability and, hence, may undesirably cause discoloration.

$B_2O_3$ not only contributes to the meltability of glass but assists in the formation of glass-network in certain compositions. $B_2O_3$ is incorporated in a proportion of about 2 to 75%, preferably about 12 to 27%, based on the total composition. If the proportion exceeds 75%, the chemical durability of glass will not be sufficiently high, while the use of $B_2O_3$ in a proportion less than 2% will result in an inadequate light transmission characteristic and a reduced meltability of glass.

$Al_2O_3$ is a component for inhibiting the devitrification and enhancing the chemical durability of glass, and is incorporated in a proportion not greater than about 15%, preferably of about 1 to 10%, based on the total composition. If the proportion exceeds 15%, the meltability of glass is considerably sacrificed.

$Li_2O$, $Na_2O$, $K_2O$, $Rb_2O$ and $Cs_2O$ are effective in improving the meltability of glass and it is preferable that one or more species be added in a proportion not greater than about 30%, more desirably of about 5 to 15%, based on the total composition. If the proportion exceeds 30%, the chemical durability of glass will become inadequate.

MgO, Cao, ZnO, BaO, SrO and PbO are effective in improving the chemical durability of glass and one or more species of them are added in a proportion not greater than about 10%, preferably not greater than about 5%, and more desirably of about 0.1 to 5%, all based on the total composition. If the proportion of this component exceeds 10%, the meltability of glass will be adversely affected.

$ZrO_2$, $La_2O_3$, $Y_2O_3$, $Ta_2O_3$ and $Gd_2O_3$ are effective in improving the chemical durability of glass and one or more of them are added in a proportion not greater than about 10%, preferably not greater than about 5% and, for still better results, of about 0.1 to 5%, based on the total composition. If the proportion of this component exceeds 10%, the devitrification tendency will be increased and the stability of glass be adversely affected.

The oxides of Fe, Ni, Mn, Co, V, Cr, Cu, Nd and Pd are effective in coloring glass in the visible region of the spectrum and it is preferable that one or more members be added in a proportion of about 0.001 to 7%, more preferably about 0.05 to 3%, based on the total composition. If the proportion of this component exceeds 7%, the light transmission of glass is decreased, while the use in a proportion less than 0.001% is inadequate in glass coloring effect.

The copper halide to be used in accordance with the first invention includes, among others, CuCl, CuBr and CuI, and glass can be doped with one or more of these species. These species of copper halide act as colorants which absorb light of a specific wavelength range in ultraviolet or visible region of the spectrum. In the first invention, this component is added in a proportion of about 0.05 to 15%, preferably about 0.3 to 8%, based on the total composition. When the proportion of this component in glass is controlled within the above range, it substantially completely intercepts light of wavelengths not longer than a given wavelength within the range of 350 to 450 nm and insures a colorant-associated spectral transmission characteristic almost completely for light longer than said wavelength. Furthermore, there is obtained a glass having an excellent transmission characteristic with a narrow absorption wavelength gradient profile. If the proportion of copper halide is less than 0.05%, the above desirable effect will not be fully realized. Conversely, if the proportion exceeds 15%, devitrification will undesirably occur.

II. Second Invention

Of the components used in the colored glass of the second invention, $SiO_2$ is a main component constituting a glass-network and it is preferable that this component be used in a proportion of about 8 to 25%, more desirably about 10 to 20%, based on the total composition. If the $SiO_2$ content exceeds 25%, the meltability of glass is adversely affected. Conversely, if it is less than 8%, the chemical durability of glass will be insufficient so that the glass tends to discolor.

$P_2O_5$ is also a main component constituting a glass-network. This component is used in a proportion of about 5 to 35%, preferably about 10 to 30%, based on the total composition. If the proportion is less than 5% or greater than 35%, there is not obtained a colored glass having the desired transmittance.

$B_2O_3$ is a component which is mainly used to improving the meltability of glass and is added at the level of not more than 30% and preferably about 10 to 25%, based on the total composition. If the proportion of this component exceeds 30%, the chemical durability of glass will be insufficient.

$Al_2O_3$ in the second invention, as in the first invention, inhibits the devitrification and enhances the chemical durability of glass. It is used in a proportion of 10 to 35%, preferably about 15 to 25%, based on the total composition. If the proportion of $Al_2O_3$ exceeds 35%, the meltability of glass will be adversely affected, while the use of this component in a proportion less than 10% will compromise the durability of glass.

$Li_2O$, $Na_2O$, $K_2O$, $Rb_2O$ and $Cs_2O$ are effective in improving the meltability of glass. It is preferable that one or more members be added in a proportion of about 5 to 20% and, for still better results, about 5 to 15%. If the proportion of this component exceeds 20%, the chemical durability of glass will be sacrificed, while the use in a proportion less than 5% will reduce the meltability of glass.

MgO, CaO, ZnO, BaO, SrO and PbO have the property to improve the chemical durability of glass and one or more members are used in a proportion not greater than 20%, preferably not greater than about 5%, and for still better results, between about 0.1 and 5%. If the proportion of this component exceeds 20%, the meltability of glass will be adversely affected.

$ZrO_2$, $La_2O_3$, $Y_2O_3$, $Ta_2O_3$ and $Gd_2O_3$ have the property to improve the chemical durability of glass and one or more members are used in a proportion not greater than about 10%, more desirably not greater than 5%, and for still better results, between about 0.1 and 5%. If the proportion of this component exceeds 10%, the devitrification tendency will be intensified and the stability of glass be also sacrificed.

In the second invention, too, the oxides of Fe, Ni, Mn, Co, V, Cr, Cu, Nd and Pd have the property to color glass in the visible region of the spectrum and it is preferable that one or more members be used in a proportion of about 0.001 to 7% and, for still better results, about 0.05 to 3% based on the total composition. If the proportion of this component exceeds 7%, the light transmittance of glass will be sacrificed, while the use of the component in a proportion less than 0.001% will not be sufficient to color the glass properly.

The copper halide to be used in the second invention also includes CuCl, CuBr and CuI, among others, and glass is doped with one or more of these species. As mentioned previously, these species of copper halide act as colorants absorbing light of a certain wavelength range in ultraviolet or visible region. In this second invention, at least one species of copper halide is used in a proportion of about 0.05 to 15%, preferably about 0.3 to 8%, based on the total glass composition. When the proportion of this component is controlled within the above range, just as in the first invention, it substantially completely intercepts light of wavelengths not longer than a certain wavelength within the range of 350 to 450 nm and insures a colorant-associated spectral transmission characteristic almost completely for the light longer than said wavelength. Furthermore, there is obtained a glass having an excellent transmission characteristic represented as a sharply inclined curve with a narrow wavelength gradient profile. If the proportion of such copper halide is less than 0.05%, the above-mentioned effect will not be fully realized. Conversely, the use of this component in excess of 15% is undesirable, for the glass will then suffer devitrification.

The colored glass of the invention can be manufactured by mixing the starting materials according to the above-described formula and treating the mixture in the per se conventional manner. For example, the starting materials in the specified proportions are melted at a temperature of about 1,200° to 1,500° C., stirred, refined, cast, heat-treated at a temperature of about 450° to 700° C. for about 0.1 to 5 hours either in the course of cooling or after cooling, and finally processed by cutting, polishing, etc. to give a glassware of the desired shape. In order to incorporate microcrystals of said copper halide in glass in the above production process, either a copper halide itself or a copper source compound, such as copper oxides, copper halides, etc., in combination with a halogenated alkali compound which can be a halogen source capable of forming a copper halide with said copper source, such as lithium halides, sodium halides, potassium halides, rubidium halides, cesium halides, etc., can be blended with the other component materials in accordance with the specified formula. Regarding the components other than copper halides, the conventional glass materials such as oxides, carbonates and hydroxides which eventually provide the intended composition can be used as they are. The cooling step referred to above should be as gradual as possible to prevent thermal straining of glass, e.g. at a rate of about 10° to 100° C./hr or preferably about 30 to 50° C/hr. For the same reason, the heating is also preferably conducted gradually at about 10° to 100° C./hr, preferably at about 30° to 70° C./hr. The heating speed and time are determinant of the crystal size of copper halide. In this invention, the crystal size is preferably controlled at about 0.1 to 10 nm in diameter. The melting step is preferably carried out in a neutral or reducing atmosphere to convert Cu ion into Cu In the refining step, a known refining agent such as $As_2O_3$, $Sb_2O_3$ or the like can be employed and the level of addition of such a refining agent is optional within the range not adversely affecting the characteristics of the colored glass of the invention. The refining agent is used usually in an amount of about 0.5 % or less, preferably about 0.05 to 0.3%, based on the total composition.

The glass of the present invention is capable of producing the following effects.

(1) In the wavelength range of 250 to 800 nm, the glass almost completely intercepts light of wavelengths not longer than a selected wavelength in the range of 350 to 450 nm and almost completely achieves a colorant-associated spectral transmission characteristic for light longer than said wavelength. Moreover, it has an excellent transmission characteristics represented as a sharply inclined curve with a narrow wavelength gradient profile.

(2) By adjusting the content or kind of copper halide, or the combination of the content and kind of copper halide, light of optional wavelengths within the range of 350 to 450 nm can be controlled.

(3) Exposure to ultraviolet light, visible light or near-infrared light does not cause changes in the above spectral transmission characteristic.

(4) Unlike the conventional colored glass, the production process is safe and it is not necessary to exercise more than usual care in handling or disposal. Therefore, the colored glass can be manufactured using the general glassmaking equipment without addition of any treating device.

(5) Since the meltability of glass is satisfactory, glass material of homogeneous composition with stable performance properties can be obtained.

(6) Therefore, the colored glass according to the present invention is of great use as glass materials for masking in an apparatus for UV-curable resin, glass materials for protection of fine arts, etc., glass materials for optical filters, glass materials for spectacles, illumination glass materials, protective glass materials for liquid crystal panels, glass materials for containers, powdery UV absorbent additives and so on.

The following examples are intended to further clarify the characteristics of the present invention.

EXAMPLES 1 through 5

The starting materials were mixed to give the compositions shown (%) in Table 1 and each composition was melted in an alumina crucible, stirred, refined, cast in a mold, and allowed to cool down to room temperature. The cast glass was heat-treated, cut and polished to give a colored glass according to the invention.

The melting was carried out in a neutral or reducing atmosphere. The cooling rate and the heating rate in the heat treatment stage were 30° C./hr and 50° C./hr, respectively.

All the compositions could be easily melted and formed and the resulting glasses were excellent in chemical durability. It was confirmed that the use of $As_2O_3$ or $Sb_2O_3$ in an amount of 0.2–0.25% in the refining stage did not cause changes in the transmission characteristics of the glasses.

TABLE 1

| Example | 1 | 2 | 3 | 4 | 5 |
|---|---|---|---|---|---|
| $SiO_2$ | 67.3 | 53.0 | 70.5 | 61.7 | 52.5 |
| $B_2O_3$ | 12.6 | 20.8 | 13.8 | 16.0 | 26.1 |
| $Al_2O_3$ | 1.0 | 4.6 | — | 3.2 | 2.0 |
| $Li_2O$ | — | — | 0.5 | — | 0.5 |
| $Na_2O$ | 11.6 | 13.4 | 6.5 | 6.0 | 12.6 |
| $K_2O$ | 1.5 | — | 3.2 | 5.5 | — |
| MgO | 1.0 | — | — | — | — |
| CaO | 2.9 | — | 3.0 | — | — |
| ZnO | — | 1.2 | — | — | — |
| BaO | — | — | 0.5 | — | — |
| SrO | — | — | — | 1.0 | — |
| $ZrO_2$ | — | — | 0.5 | — | — |
| $La_2O_3$ | — | — | — | 0.5 | — |
| $Y_2O_3$ | — | — | — | — | 0.8 |
| CuCl | 1.8 | — | — | — | — |
| CuBr | — | 6.4 | 0.9 | — | 5.2 |
| CuI | — | — | — | 6.0 | — |
| Colorant |  |  |  |  |  |
| CuO | 0.3 | — | — | — | — |
| $Fe_2O_3$ | — | 0.6 | — | — | — |
| NiO | — | — | 0.6 | — | — |
| CoO | — | — | — | 0.1 | — |
| $Nd_2O_3$ | — | — | — | — | 0.3 |
| Melting temperature | 1400° C. | 1380° C. | 1450° C. | 1400° C. | 1250° C. |
| Heat treatment temperature | 550° C. | 550° C. | 670° C. | 630° C. | 610° C. |
| Heat treatment time | 2 hours | 0.5 hour | 5 hours | 3 hours | 0.1 hour |

EXAMPLES 6 through 10

The starting materials were mixed to give the compositions shown (%) below in Table 2 and each composition was melted in an alumina crucible and treated in the same manner as Examples 1 through 5 to give colored glasses of the invention.

All the compositions could be easily melted and formed and the resulting glasses were excellent in chemical durability. It was confirmed that the use of $As_2O_3$ or $Sb_2O_3$ in an amount of 0.2 to 0.25% in the refining stage did not cause changes in the transmission characteristics of the glasses.

TABLE 2

| Example | 6 | 7 | 8 | 9 | 10 |
|---|---|---|---|---|---|
| $SiO_2$ | 62.0 | 56.5 | 12.1 | 13.5 | 67.7 |
| $P_2O_5$ | — | — | 27.0 | 30.0 | — |
| $B_2O_3$ | 17.8 | 16.8 | 24.0 | 11.8 | 23.1 |
| $Al_2O_3$ | — | 7.2 | 17.0 | 23.1 | — |
| $Li_2O$ | — | — | — | 1.5 | — |
| $Na_2O$ | 8.2 | — | — | 12.7 | 3.3 |
| $K_2O$ | 2.0 | 10.5 | 13.1 | 1.8 | 1.2 |
| $Rb_2O$ | 0.5 | — | — | — | — |
| $Cs_2O$ | — | 0.5 | 1.0 | — | — |
| CaO | — | 2.2 | 1.3 | — | — |
| ZnO | — | 2.2 | — | 0.9 | 1.1 |
| BaO | 0.5 | — | 0.5 | — | — |
| SrO | — | — | — | 1.5 | — |
| PbO | 2.0 | — | — | — | — |
| $Ta_2O_3$ | 0.5 | — | — | — | — |
| $Gd_2O_3$ | — | — | — | — | 0.5 |
| CuCl | 1.7 | — | 2.0 | — | 1.09 |
| CuBr | — | 2.9 | 1.2 | 3.19 | — |
| Colorant |  |  |  |  |  |
|  | (a):0.3 | (b):1.2 | (c):0.8 | (d):0.01 | (e):1.5 |
|  |  |  |  |  | (f):0.01 |
|  |  |  |  |  | (g):0.5 |
| Melting temperature | 1400° C. | 1420° C. | 1350° C. | 1370° C. | 1450° C. |
| Heat treatment temperature | 580° C. | 620° C. | 650° C. | 600° C. | 650° C. |
| Heat treatment time | 2 hours | 3 hours | 2 hours | 3 hours | 2 hours |

Note: (a)...$V_2O_3$, (b)...MnO, (c)...$Cr_2O_3$, (d)...PdO, (e)...NiO, (f)...CoO, (g)...CuO

COMPARATIVE EXAMPLES 1 through 5

The starting materials were mixed to give the compositions shown (%) in Table 3 and each composition was melted in alumina crucible and treated in the same manner as Examples 1 through 5 to give Comparative Examples of colored glass.

Incidently, the colored glasses of Comparative Examples were not heat-treated because heat-treatment does not improve the characteristics. The same applies to Comparative Examples 6 through 11 which appear hereinafter.

TABLE 3

| Comparative Example | 1 | 2 | 3 | 4 | 5 |
|---|---|---|---|---|---|
| $SiO_2$ | 67.3 | 59.4 | 70.5 | 67.7 | 57.7 |
| $B_2O_3$ | 12.6 | 20.8 | 13.8 | 16.0 | 26.1 |
| $Al_2O_3$ | 1.0 | 4.6 | — | 3.2 | 2.0 |
| $Li_2O$ | 1.8 | — | 0.5 | — | 0.5 |
| $Na_2O$ | 11.6 | 13.4 | 6.5 | 6.0 | 12.6 |
| $K_2O$ | 1.5 | — | 3.2 | 5.5 | — |
| MgO | 1.0 | — | — | — | — |
| CaO | 2.9 | — | 3.0 | — | — |
| ZnO | — | 1.2 | — | — | — |
| BaO | — | — | 0.5 | — | — |
| SrO | — | — | — | 1.0 | — |
| $ZrO_2$ | — | — | 0.5 | — | — |
| $La_2O_3$ | — | — | — | 0.5 | — |
| $Y_2O_3$ | — | — | — | — | 0.8 |
| $Gd_2O_3$ | — | — | 0.9 | — | — |
| Colorant |  |  |  |  |  |
| CuO | 0.3 | — | — | — | — |
| $Fe_2O_3$ | — | 0.6 | — | — | — |
| NiO | — | — | 0.6 | — | — |
| CoO | — | — | — | 0.1 | — |
| $Nd_2O_3$ | — | — | — | — | 0.3 |
| Melting temperature | 1400° C. | 1380° C. | 1450° C. | 1400° C. | 1250° C. |

COMPARATIVE EXAMPLES 6 through 10

The starting materials were mixed to give the compositions shown (%) in Table 4 and each composition was melted in an alumina crucible and treated in the same manner as Examples 1 through 5 to give Comparative Examples of colored glass.

TABLE 4

| Comparative Example | 6 | 7 | 8 | 9 | 10 |
|---|---|---|---|---|---|
| $SiO_2$ | 62.0 | 59.4 | 15.3 | 13.5 | 67.7 |
| $P_2O_5$ | — | — | 27.0 | 30.0 | — |
| $B_2O_3$ | 17.8 | 16.8 | 24.0 | 14.99 | 23.1 |
| $Al_2O_3$ | — | 7.2 | 17.0 | 23.1 | — |
| $Li_2O$ | — | — | — | 1.5 | — |
| $Na_2O$ | 8.2 | — | — | 12.7 | 3.3 |
| $K_2O$ | 3.7 | 10.5 | 13.1 | 1.8 | 1.2 |
| $Rb_2O$ | 0.5 | — | — | — | — |
| $Cs_2O$ | — | 0.5 | 1.0 | — | — |
| CaO | — | 2.2 | 1.3 | — | 1.09 |
| ZnO | — | 2.2 | — | 0.9 | 1.1 |

TABLE 4-continued

| Comparative Example | 6 | 7 | 8 | 9 | 10 |
|---|---|---|---|---|---|
| BaO | 5.0 | — | 0.5 | — | — |
| SrO | — | — | — | 1.5 | — |
| PbO | 2.0 | — | — | — | — |
| Ta$_2$O$_3$ | 0.5 | — | — | — | 0.5 |
| Colorant | (a):0.3 | (b):1.2 | (c):0.8 | (d):0.01 | (e):1.5 (f):0.01 (g):0.5 |
| Melting temperature | 1400° C. | 1420° C. | 1350° C. | 1370° C. | 1450° C. |

Note: (a)...V$_2$O$_3$, (b)...MnO, (c)...Cr$_2$O$_3$, (d)...PdO, (e)...NiO, (f)...CoO, (g)...CuO EXAMPLE 11 and Comparative Example 11

The starting materials were mixed to give the compositions shown in Table 5 and each composition was melted in an alumina crucible and treated in the same manner as Examples 1 through 5 to give colored glass.

TABLE 5

|  | Example 11 | Comparative Example 11 |
|---|---|---|
| SiO$_2$ | 67.3 | 67.3 |
| B$_2$O$_3$ | 12.17 | 13.67 |
| Al$_2$O$_3$ | 1.0 | 1.0 |
| Na$_2$O | 11.6 | 11.6 |
| K$_2$O | 1.5 | 1.5 |
| MgO | 1.0 | 1.0 |
| CaO | 2.9 | 2.9 |
| CuCl | 1.5 | — |
| Colorant |  |  |
| MnO | 1.0 | 1.0 |
| CoO | 0.03 | 0.03 |
| Melting temperature | 1400° C. | 1400° C. |

TEST EXAMPLE 1

The spectral transmission characteristics of the glasses (thickness: 2 mm) obtained in Examples 1 through 10 were investigated by irradiating them with light in the wavelength range of 300 to 800 nm. The results are shown in FIGS. 1 through 10.

It is clear from FIGS. 1 through 10 that the colored glasses according to the invention effectively intercept light in the ultraviolet region of the spectrum and have a sharp absorption characteristic with a narrow wavelength gradient profile.

Each of the glasses obtained in Examples 1 through 10 was irradiated with ultraviolet rays using a 500 W super-high-pressure mercury vapor lamp at a distance of 10 cm and its spectral characteristic was then investigated by exposing it to light in the wavelength region of 250 to 800 nm. The resulting transmittance curves were in agreement with the curves of the corresponding glasses of Examples 1 through 10 prior to ultraviolet light irradiation, indicating that irradiation of the glass of the invention with ultraviolet light does not cause changes in transmission characteristic.

TEST EXAMPLE 2

The spectral transmission characteristics of the glasses (thickness: 2 mm) obtained in Comparative Examples 1 through 10 were investigated by irradiating them with light in the wavelength region of 300 to 800 nm. The results are shown in FIGS. 11 through 20, respectively.

It is apparent from FIGS. 11 through 20 that the colored glasses of Comparative Examples cannot effectively intercept light in the ultraviolet region and have a broad absorption characteristic with a wide wavelength gradient profile.

TEST EXAMPLE 3

Figure 1:
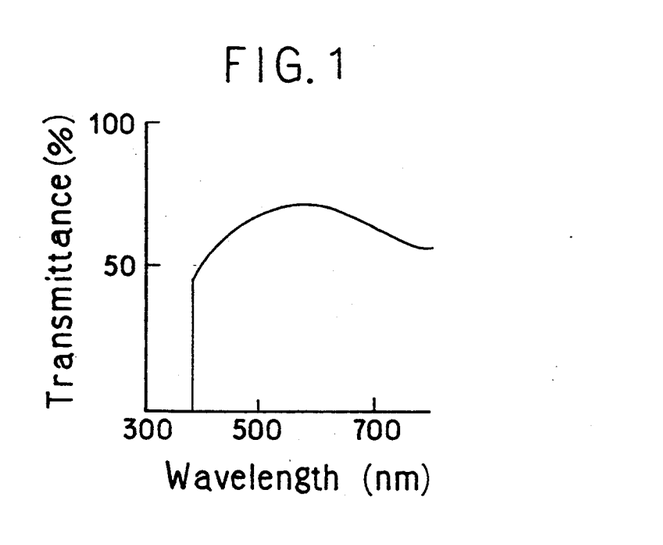
FIGS. 1 through 10 and 21 are graphs showing the spectral transmission characteristics of the colored glasses of the invention.
Figure 2:
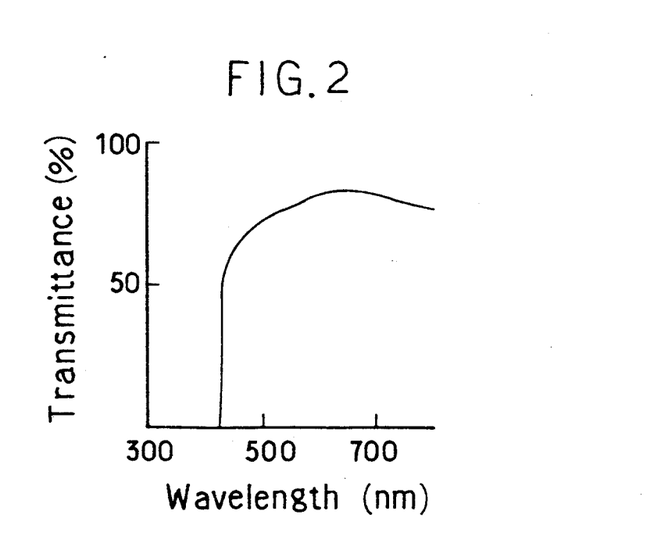
Figure 3:
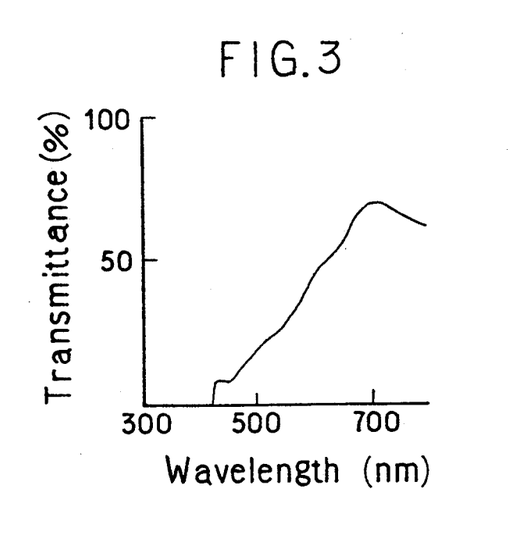
Figure 4:
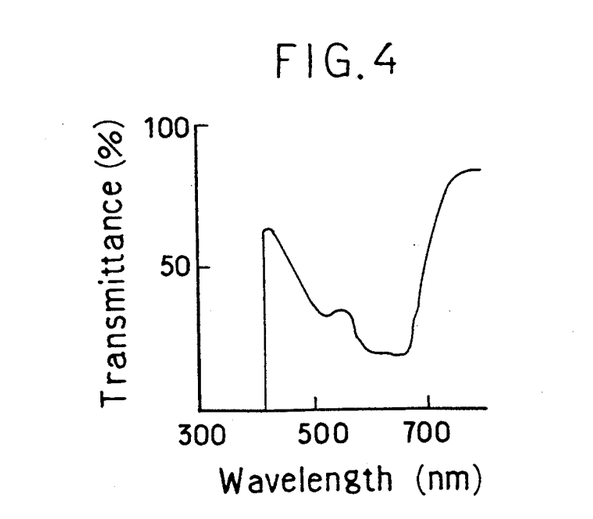
Figure 5:
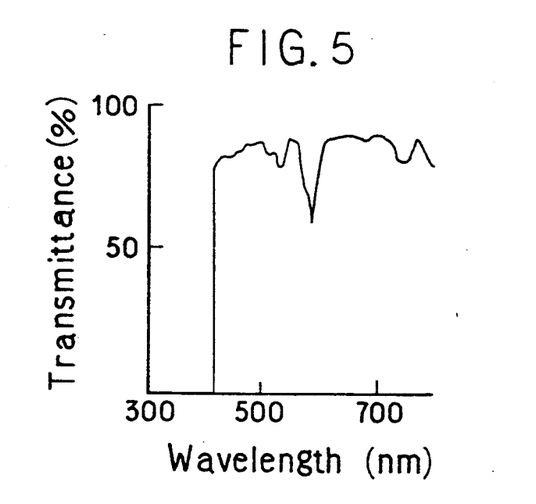
Figure 6:
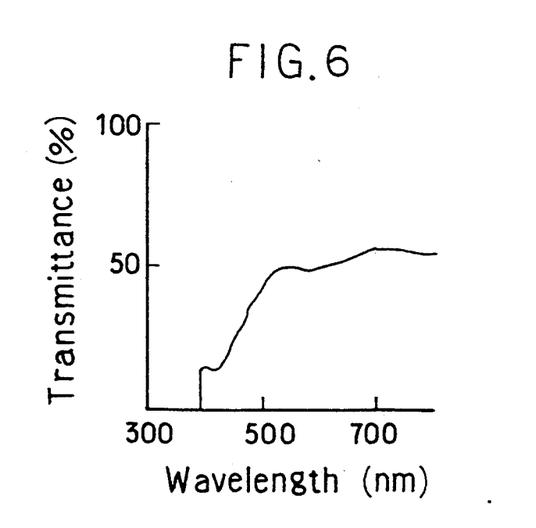
Figure 7:
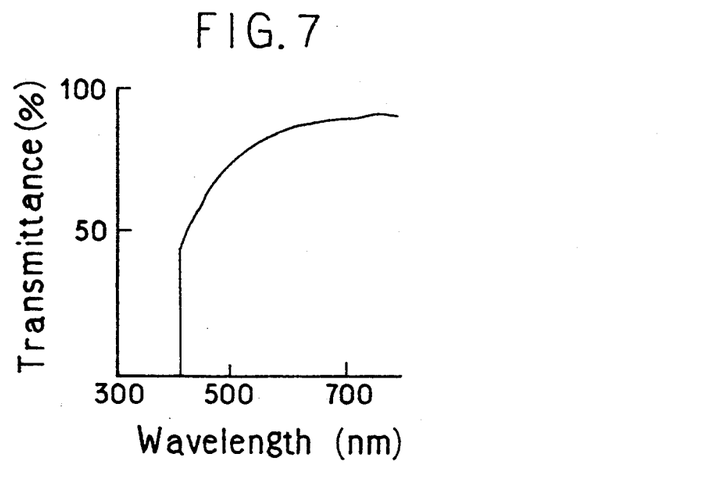
Figure 8:
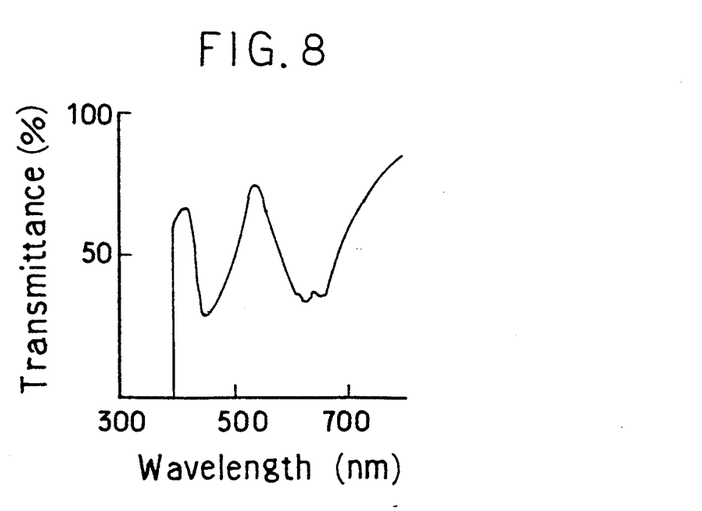
Figure 9:
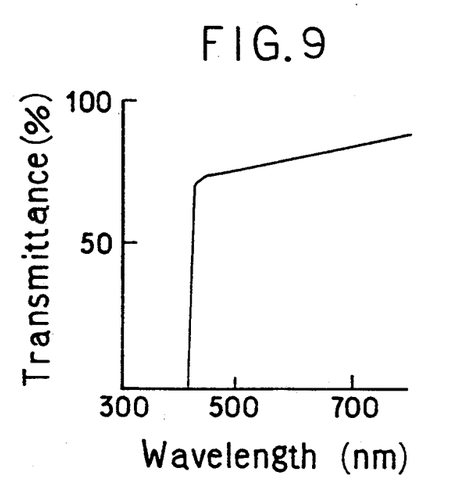
Figure 10:
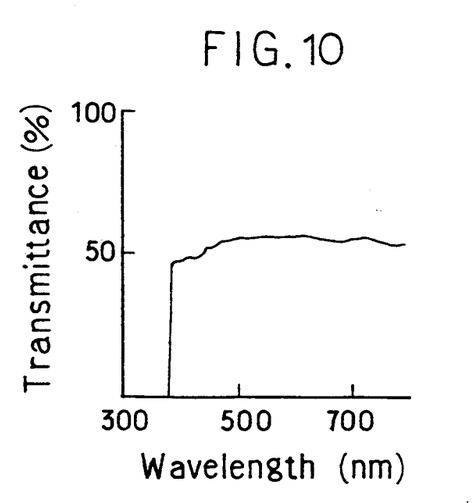
Figure 11:
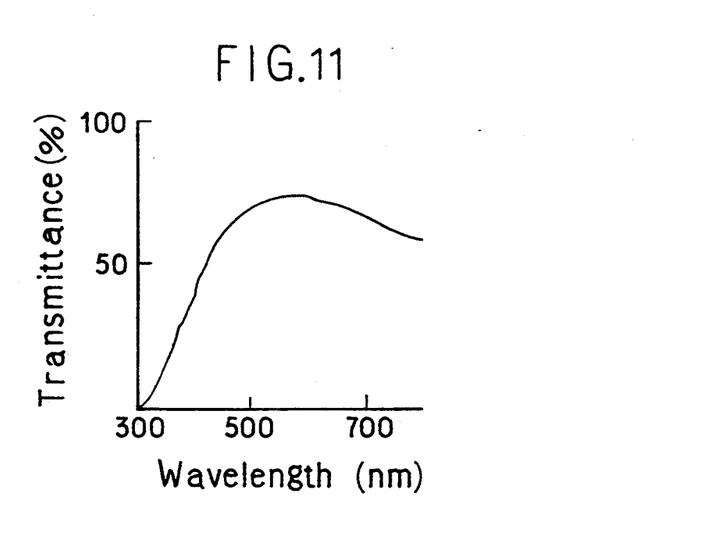
FIGS. 11 through 20 and 22 are graphs showing the spectral transmission characteristics of the colored glasses of comparative examples.
Figure 12:
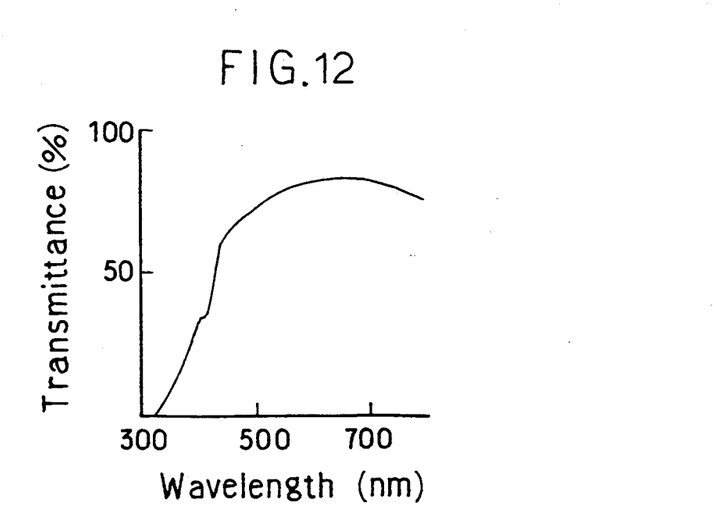
Figure 13:
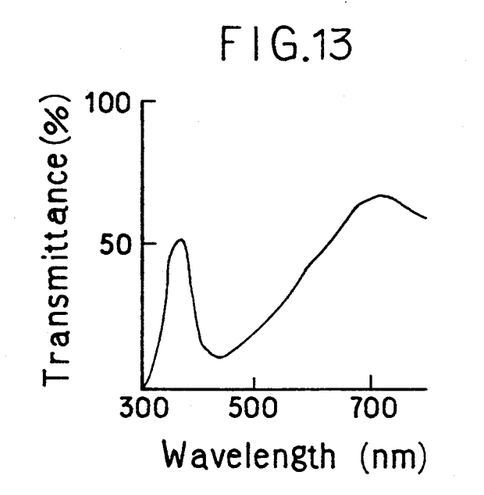
Figure 14:
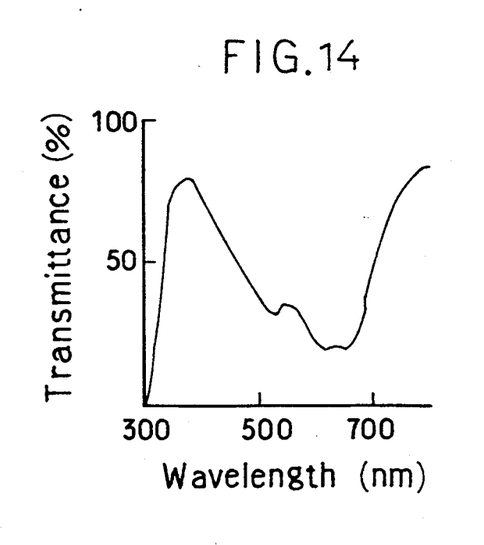
Figure 15:
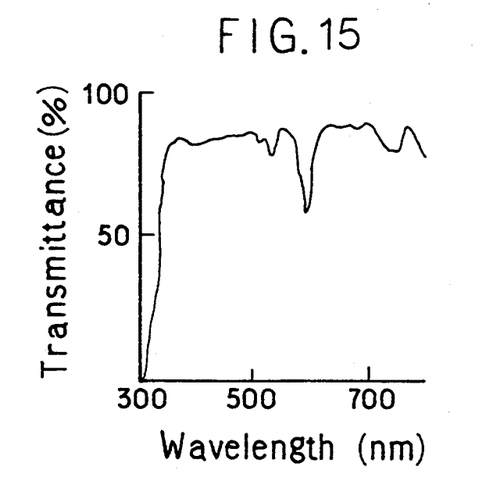
Figure 16:
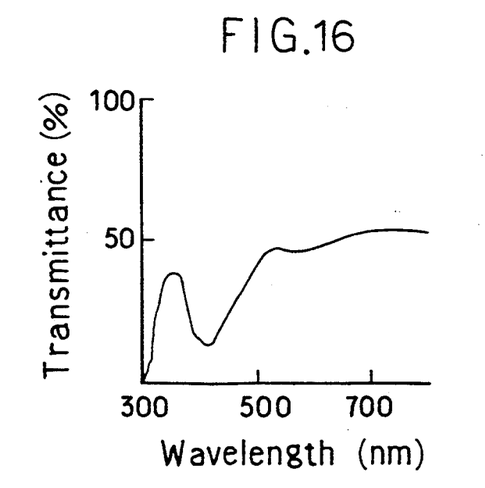
Figure 17:
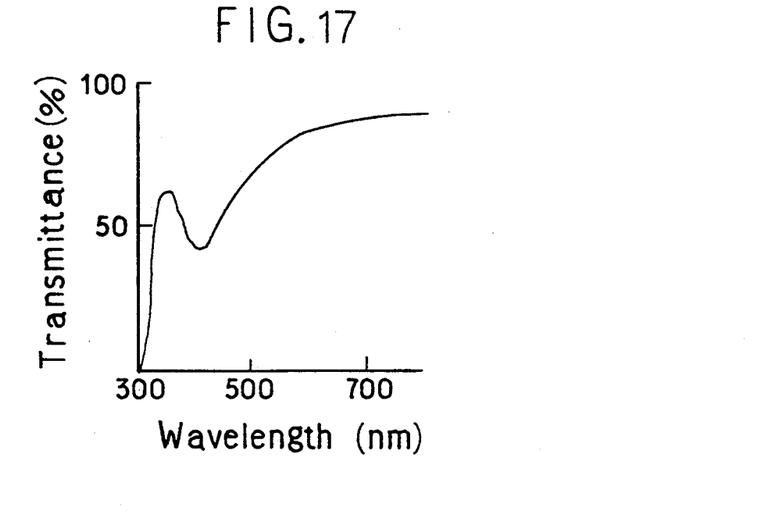
Figure 18:
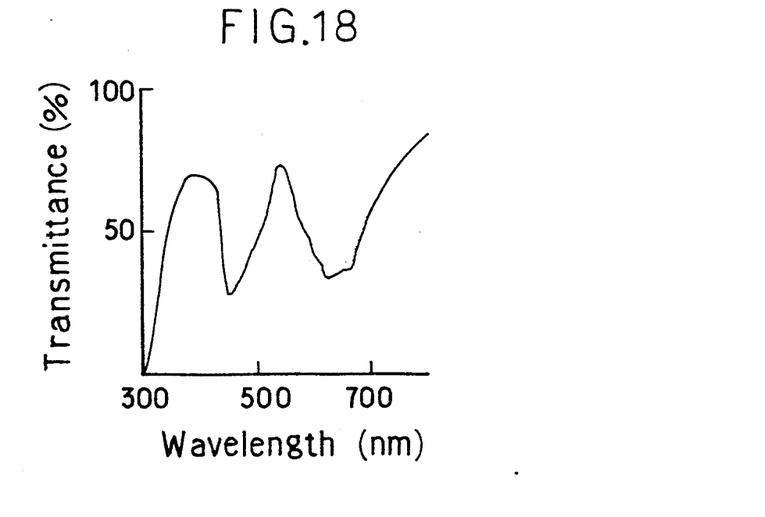
Figure 19:
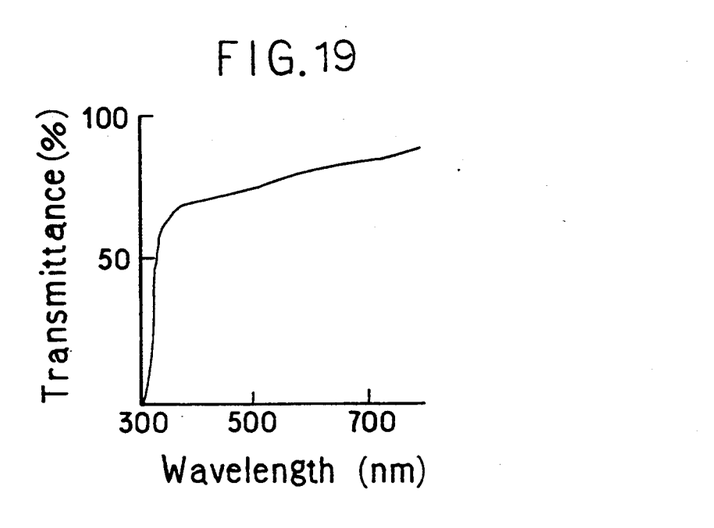
Figure 20:
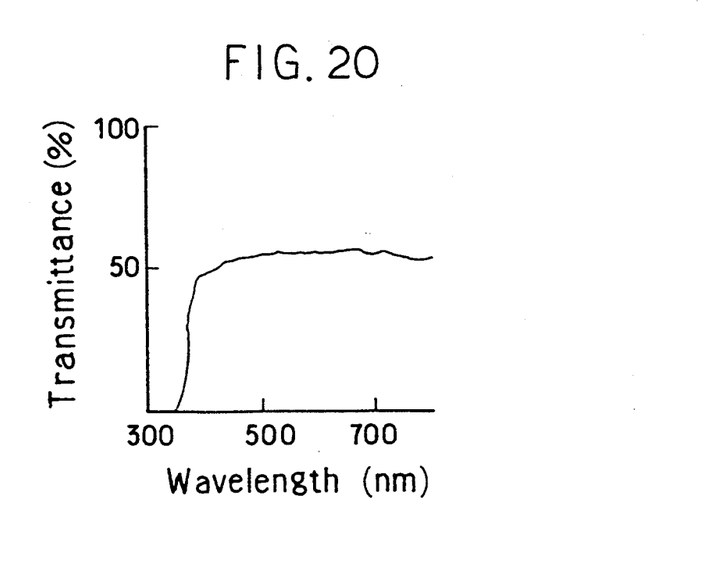
Figure 21:
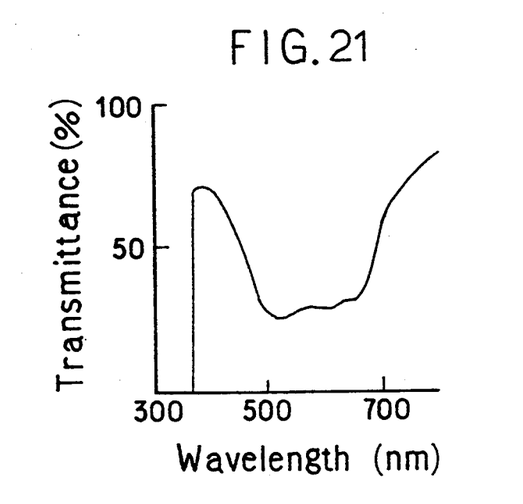
Figure 22:
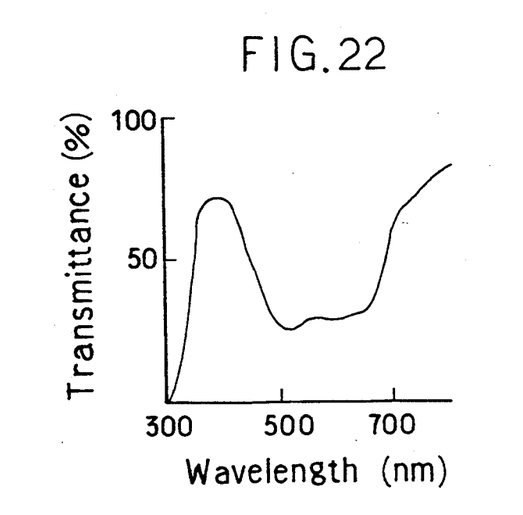

The spectral characteristics of the glasses (thickness: 2 mm) obtained in Example 11 and Comparative Example 11 were investigated by irradiating them with light in the wavelength region of 300 to 800 nm. The results are shown in FIGS. 21 and 22, respectively. It is apparent from FIGS. 21 and 22 that the colored glass according to the invention effectively intercepts light in the ultraviolet region and has a sharp absorption characteristic with a narrow wavelength gradient profile.

We claim:

1. A colored glass comprising 20 to 85% by weight of SiO$_2$, 2 to 75% by weight of B$_2$O$_3$, not more than 15% by weight of Al$_2$O$_3$, not more than 30% by weight of at least one member of Li$_2$O, Na$_2$O, K$_2$O, Rb$_2$O and Cs$_2$O, not more than 10% by weight of at least one member of MgO, CaO, ZnO, BaO, SrO and PbO, not more than 10% by weight of at least one member of ZrO$_2$, La$_2$O$_3$, Y$_2$O$_3$, Ta$_2$O$_3$ and Gd$_2$O$_3$, 0.05 to 15% by weight of at least one copper halide, and 0.001 to 7% by weight of at least one member of oxides of Fe, Ni, Mn, Co, V, Cr, Cu, Nd and Pd.

2. A colored glass according to claim 1 which comprises 50 to 71% by weight of SiO$_2$, 12 to 27% by weight of B$_2$O$_3$, 0.1 to 10% by weight of Al$_2$O$_3$, 5 to 15% by weight of at least one member of Li$_2$O, Na$_2$O, K$_2$O, Rb$_2$O and Cs$_2$O, 0.1 to 5% by weight of at least one member of MgO, CaO, ZnO, BaO, SrO and PbO, 0.1 to 5% by weight of at least one member of ZrO$_2$, La$_2$O$_3$, Y$_2$O$_3$, Ta$_2$O$_3$ and Gd$_2$O$_3$, 0.3 to 8% by weight of at least one copper halide, and 0.05 to 3% by weight of at least one member of oxides of Fe, Ni, Mn, Co, V, Cr, Cu, Nd and Pd.

* * * * *